United States Patent [19]

Lamoureux

[11] Patent Number: 5,363,636
[45] Date of Patent: Nov. 15, 1994

[54] ROTARY LAWN MOWER BLADE WITH UPTURNED CUTTING EDGES FOR MAKING MULTIPLE CUTS

[76] Inventor: William R. Lamoureux, 1507 Ebb Dr., Wilmington, N.C. 28409

[21] Appl. No.: 841,027

[22] Filed: Feb. 25, 1992

[51] Int. Cl.⁵ .............................................. A01D 34/68
[52] U.S. Cl. ......................................... 56/255; 56/295
[58] Field of Search ........ 56/255, 295, 17.5, DIG. 17, 56/DIG. 20

[56] References Cited

U.S. PATENT DOCUMENTS

| | | | |
|---|---|---|---|
| 3,003,298 | 10/1961 | Wininger | 56/295 |
| 4,318,268 | 3/1982 | Szymanis | 56/255 |
| 4,665,683 | 5/1987 | Paolucci | 56/17.5 X |
| 5,094,065 | 3/1992 | Azbell | 56/295 X |

FOREIGN PATENT DOCUMENTS 0300642 1/1989 European Pat. Off. .............. 56/295

*Primary Examiner*—Terry Lee Melius
*Attorney, Agent, or Firm*—Rhodes, Coats & Bennett

[57] ABSTRACT

The present invention relates to a rotary lawn mower blade that is designed to make multiple cuts of grass or other material being cut as the lawn mower blade is advanced over a cutting area. This is achieved by providing a generally upturned cutting edge about each end of the lawn mower blade. Because the cutting edge is inclined outwardly and upwardly, it follows that the grass or other material being cut will be progressively cut and recut as the mower blade passes over underlying material to be cut.

3 Claims, 2 Drawing Sheets

ROTARY LAWN MOWER BLADE WITH UPTURNED CUTTING EDGES FOR MAKING MULTIPLE CUTS

FIELD OF INVENTION

The present invention relates to rotary lawn mowers and more particularly to rotary lawn mower blades for recutting grass and other material being cut.

BACKGROUND OF THE INVENTION

Rotary lawn mowers are widely accepted throughout the United States and the World as the most basic form of blade for cutting grass. These rotary lawn mower blades generally include cutting edges about the leading edges of the blade along the outer end potions of the blade. Basically, the cutting edges are disposed in a horizontal plane such that the blade acts to cut the grass or other material being cut at a single height. Thus, there is no control over the length of the cuttings. Consequently, what is typically produced is masses of long grass clippings that fall onto the cut grass and tend to choke or kill the surrounding lawn not to mention having a detrimental effect on the appearance of the lawn as a whole.

There has been and continues to be a need for a rotary lawn mower blade that will make multiple cuts of grass as the blade is advanced over a particularly cutting area.

SUMMARY AND OBJECTS OF THE INVENTION

The present invention entails a rotary lawn mower blade that is designed to make multiple cuts of grass as the blade is advanced over a cutting area. This is achieved by providing a bevelled cutting edge about the opposed ends of the blade wherein the bevelled cutting edge is inclined upwardly and outwardly. Consequently, as the blade has been advanced over a cutting area the grass or other material being cut is gradually cut to a selected height by the advancing upwardly inclined cutting edge of the rotary blade. Disposed inwardly of the upwardly inclined cutting edge is a flat or generally horizontal cutting edge. This portion of the cutting edge results in a final smooth cut lawn with no long grass cuttings strewn about the lawn.

It is therefore an object of the present invention to provide a rotary lawn mower blade that is capable of cutting grass and other material into very short pieces.

Another object of the present invention resides in the provision of a rotary lawn mower blade that is designed to make multiple cuts of grass or other material being cut as the lawn mower blade is advanced over a selected cutting area.

A more specific object of the present invention resides in the provision of a rotary lawn mower blade having an outwardly directed upturned cutting edge that is inclined at an angle such that as the rotary lawn mower blade advances over an area the grass or material being passed over will be progressively cut to a select height.

Other objects and advantages of the present invention will become apparent and obvious from a study of the following description and the accompanying drawings which are merely illustrative of such invention.

DETAILED DESCRIPTION OF THE INVENTION

Figure 1:
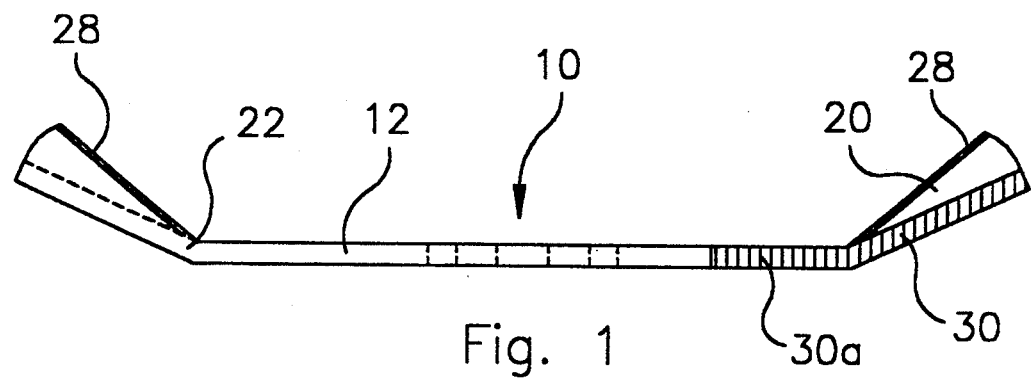
FIG. 1 is a front elevational view of the rotary lawn mower blade of the present invention.
Figure 2:
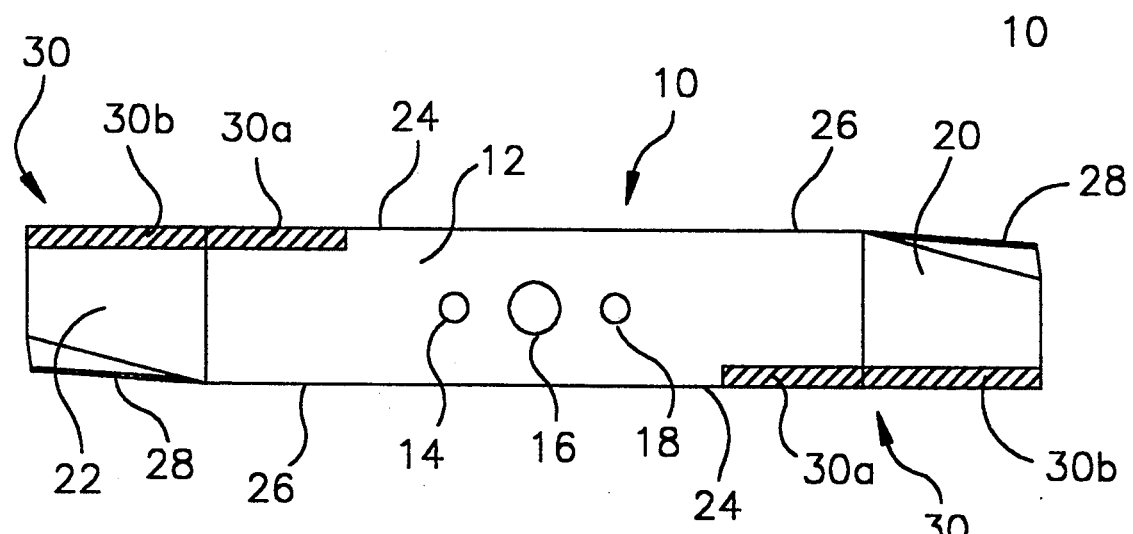
FIG. 2 is a top plan view of the rotary lawn blade of the present invention.
Figure 3:
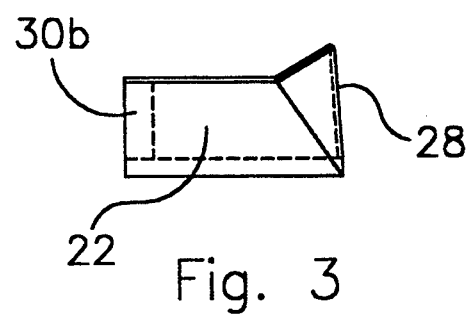
FIG. 3 is an end elevational view of the rotary lawn blade of the present invention.

With further reference to the drawings, the rotary lawn mower blade of the present invention is shown therein and indicated generally by the numeral 10. Lawn mower blade 10 includes an elongated main body portion 12. Formed in the central portion of the main body portion 12 is a series of openings 14, 16 and 18 for securing the blade 10 to a rotary-type lawn mower which is represented by a housing 32 such as shown in FIG. 4.

Blade 10 includes a pair of end portions 20 and 22. Extending on opposite opposed edges of the respective end portions 20 and 22 is a leading edge 24 and a trailing edge 26. Formed in conventional fashion about each trailing edge 26 is a conventional lift tab 28. Essentially, the trailing edge of the blade about the outer remote end portion is turned up so as to create lift for causing the various clippings to become airborne. By generating this system of air beneath the housing 32, it then becomes possible to suspend the clippings in an airborne state and to expel the same from the lawn mower in conventional fashion.

Now turning to the leading edge 26, it is seen that formed about each leading edge about the outer end portion of the blade 10 is a bevelled cutting edge indicated generally by the numeral 30. Each bevelled cutting edge 30 includes two separate and distinct cutting segments 30A and 30B. Segment 30A is an inner horizontal bevelled cutting edge segment while 30B is an upwardly inclined segment. It is seen from the drawings that both segments 30A and 30B are continuous.

Figure 4:
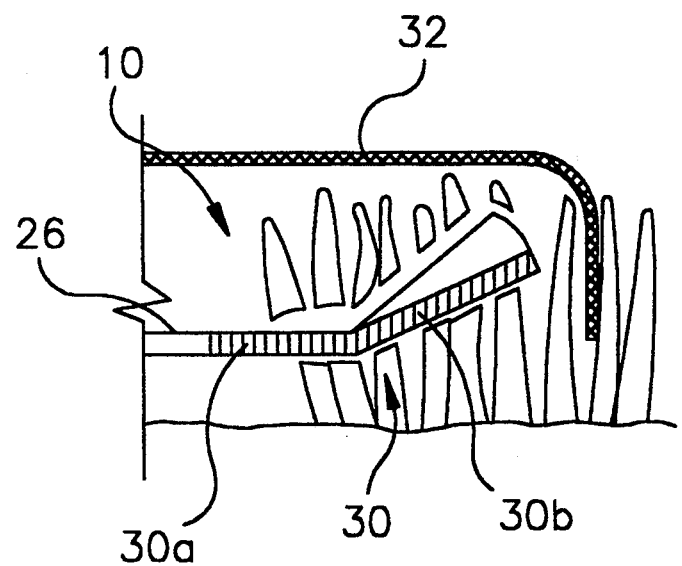
FIG. 4 is a fragmentary front elevational view of a portion of the lawn mower blade of the present invention housed within a lawn mower housing structure.

As illustrated in FIG. 4, the inclined segment 30B extends from the outward end of the inner horizontal segment 30A upwardly at an acute angle. This effectively means that each strand of grass or cutting material is cut and recut as the outer end portions 20 and 22 of the blade pass over the respective strands. This means that each strand of grass or other cutting material is cut and recut as the lawn mower blade advances over a cutting area. Finally, the grass or cutting material is engaged by the cutting edge extending along the horizontal segment 30A. This is, of course, the final cut and makes a smooth horizontal cut across the grass material. Therefore, it is appreciated that the inclined segment 30B effectively cuts and recuts the material so as to produce relatively small cut clippings while the horizontal segment 30A makes the final cut.

It is therefore appreciated that the rotary lawn mower blade 10 of the present invention provides multiple cutting heights thus cutting and recutting the grass in short pieces as the blade is moved or advanced over tall grass. These short clippings are thrown out to disappear in the surrounding plant growth. As pointed out above, the last stage of the cutting is on the flat or horizontal segment of the cutting edge 30 which results in a smooth cut lawn with no long grass strewn about the lawn. By providing short grass cuttings, it is appreciated that these short cuttings disappear and decompose rather easily in the lawn. The result of utilizing the rotary lawn mower blade of the present invention is that the requirement for raking and disposing of relatively long grass clippings is eliminated.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A lawn mower blade having upwardly and outwardly inclined cutting edges formed on opposite ends of the blade for making multiple cuts of upstanding grass as the blade is rotated and advanced over a cutting area, the blade comprising: a main body having opposed end portions; first and second upwardly and outwardly inclined cutting ends extending outwardly from the opposed ends of the main body with the inclined cutting ends forming the outer portions of the law mower blade; each upwardly and outwardly inclined cutting end having an outer terminal side edge that defines the length of the lawn mower blade, an upwardly and outwardly inclined leading edge, and a trailing edge; a beveled cutting edge formed on the leading edge of each upwardly and outwardly inclined cutting end and extending from a point adjacent an opposite end portion of the main body upwardly and outwardly therefrom along the leading edge of the inclined cutting end and terminating adjacent the outer terminal side edge of the cutting end so as to give rise to upwardly and outwardly extending cutting edges formed on opposite ends of the blade for making multiple cuts of upstanding grass as the blade is rotated and passed over the cutting area such that the inclined cutting edge formed on the upwardly and outwardly inclined cutting ends progressively cuts the standing grass from a certain height to a lower cutting height as the blade is passed over the cutting area.

2. The lawn mower blade of claim 1 wherein the main body of the blade is straight and generally horizontal with respect to the upwardly and outwardly inclined cutting ends.

3. The lawn mower blade of claim 1 wherein the upwardly and outwardly inclined cutting edge formed on the inclined cutting ends extends onto the main body portion of the blade.

* * * * *